(12) United States Patent
Khanna

(10) Patent No.: US 8,813,178 B1
(45) Date of Patent: Aug. 19, 2014

(54) SYSTEMS AND METHODS FOR PREPARING AND SUBMITTING DOCUMENTS TO COMPLY WITH SECURITIES REGULATIONS

(76) Inventor: Niraj Khanna, Kirkland (CA)

( * ) Notice: Subject to any disclaimer, the term of this patent is extended or adjusted under 35 U.S.C. 154(b) by 0 days.

(21) Appl. No.: 13/563,702

(22) Filed: Jul. 31, 2012

Related U.S. Application Data

(60) Provisional application No. 61/514,015, filed on Aug. 1, 2011.

(51) Int. Cl.
*H04L 29/00* (2006.01)

(52) U.S. Cl.
USPC .......... 726/1; 726/2; 726/3; 726/4; 726/5; 726/6; 726/7; 726/8; 726/9; 726/10

(58) Field of Classification Search
USPC .......................................... 726/1–10
See application file for complete search history.

(56) References Cited

U.S. PATENT DOCUMENTS

2008/0250157 A1* 10/2008 Ohata .................. 709/236
2010/0122154 A1*  5/2010 Howell et al. .......... 715/233

* cited by examiner

*Primary Examiner* — Ghazal Shehni

(57) ABSTRACT

Systems and methods for preparing and submitting documents to a regulatory agency in an on-line environment are provided, which are used for the purpose of complying with various securities regulations. The systems generally include a server that hosts a website in which a user may access, prepare, and submit one or more of various standardized reports to the regulatory agency through an on-line portal. The systems further include a database that includes (i) a listing of the standardized reports (and a listing of data fields included within such reports) and (ii) a listing of acceptable data types for each of such data fields. The website is preferably configured to display all of such data fields for a single standardized report within a single graphical user interface of the website.

20 Claims, 3 Drawing Sheets

SYSTEMS AND METHODS FOR PREPARING AND SUBMITTING DOCUMENTS TO COMPLY WITH SECURITIES REGULATIONS

CROSS-REFERENCE TO RELATED APPLICATIONS

This application claims priority to, and incorporates by reference, U.S. Provisional Patent Application No. 61/514,015, filed Aug. 1, 2011.

FIELD OF THE INVENTION

The field of the present invention relates to systems and methods for preparing and submitting documents to a regulatory agency to comply with securities regulations. More particularly, the present invention relates to systems and methods for preparing and submitting documents to a regulatory agency in an on-line environment, for the purpose of complying with various securities regulations.

BACKGROUND OF THE INVENTION

The U.S. Securities and Exchange Commission (the "SEC") is the federal agency that is responsible for monitoring compliance with, and enforcing, the federal securities laws—and regulating the securities industry, U.S. stock exchanges, and other securities markets in the U.S. In pursuit of this function, the SEC requires public companies to submit, among other things, quarterly and annual reports (as well as other periodic reports), which contain information regarding a public company's financial status, material events related to such company, and other information that is important to current and prospective investors. The SEC publishes these reports in an on-line database known as the Electronic Data Gathering, Analysis and Retrieval System (commonly referred to as "EDGAR"). This way, current and prospective investors may quickly and easily access such important information regarding a particular company.

Unfortunately, the preparation of such SEC-mandated reports is cumbersome, time consuming, and expensive for the reporting companies. There are currently various options available for preparing such SEC documentation using electronic systems. However, these systems suffer from many drawbacks. For example, many of these systems do not allow a user to view, and enter the required information, into the numerous fields that comprise SEC reports within a single page. In other words, these currently-available systems do not provide a single, dynamic page that effectively allows the user to enter all relevant and necessary information pertaining to the respective filing, without having to access (click through) multiple pages, tabs or other on-line modules. In addition, many of these systems do not provide immediate, real-time validation (i.e., as data are entered into the respective fields) and notification to the user that the data entered into such forms comply with certain SEC requirements. Accordingly, there continues to be a need for improved systems and methods for electronically preparing and submitting documents to the SEC, in an on-line environment.

SUMMARY OF THE INVENTION

According to certain aspects of the present invention, systems and methods for preparing and submitting documents to a regulatory agency in an on-line environment are provided, which are used for the purpose of complying with various securities regulations. The systems generally include a server that hosts a website in which a user may access, prepare, and submit one or more of various standardized reports to a regulatory agency through an on-line portal, such as a Section 16 report to the SEC via the EDGAR system. The systems further include a database that includes (i) a listing of the standardized reports that may be prepared and submitted to the regulatory agency using the systems (and a listing of data fields included within such reports) and (ii) a listing of acceptable data types for each of such data fields.

The invention provides that the systems further comprise, among other things, a real-time validation engine that determines whether data entered by a user, when preparing a report, complies with various regulatory requirements, technical requirements (e.g., EDGAR compatibility requirements), and other requirements as the data are being entered into the pertinent fields of such report. Still further, the systems of the present invention preferably comprise various tools that facilitate, expedite, and minimize the amount of errors arising from the preparation of the reports described herein.

The website is preferably configured to display all of such data fields for a single standardized report within a single graphical user interface of the website. This allows a user to more quickly prepare a report in its entirety, without having to navigate through multiple pages or tabs to complete a filing, which is often the case with currently-available on-line filing systems. Still further, such design allows a user to view all of the information that must be entered, or the errors that must be corrected, in the form during a single viewing. In addition, the invention provides that the graphical user interface that is presented to a user, during the preparation of a report, exhibits the same (or substantially the same) appearance and format as that of the applicable standardized regulatory form, e.g., the same (or substantially the same) appearance and format as the SEC's Section 16 forms (e.g., Forms 3, 3a, 4, 4a, 5, and 5a), schedules 13D and 13G, and forms 13H, 13F-HR, 13F-NT, 12b-25, NT 10-K, NT 10-Q, NT 11-K, NT 20-F, Form D and Form 144. The currently-available on-line electronic filing systems have been unable to effectively accomplish such a design, due to the inherent technological complexities that must be overcome in the underlying codebase or "logic" of the system.

According to certain related aspects of the present invention, methods for preparing and submitting documents to a regulatory agency in an on-line environment are provided. Such methods generally comprise using the systems described herein to electronically prepare and submit such reports to a regulatory agency.

The above-mentioned and additional features of the present invention are further illustrated in the Detailed Description contained herein.

DETAILED DESCRIPTION OF THE INVENTION

The following will describe, in detail, several novel embodiments of the present invention. These embodiments are provided by way of explanation only, and thus, should not unduly restrict the scope of the invention. In fact, those of ordinary skill in the art will appreciate upon reading the present specification and viewing the present drawings that the invention teaches many variations and modifications, and that numerous variations of the invention may be employed, used and made without departing from the scope and spirit of the invention.

According to certain preferred embodiments, the invention provides a web-based solution that is designed for publicly traded companies, securities attorneys, principal accounting officers and other professionals who periodically file compliance reports, e.g., Section 16 forms (Forms 3, 3a, 4, 4a, 5, and 5a) schedules 13D and 13G, and forms 13H, 13F-HR, 13F-NT, 12b-25, NT 10-K, NT 10-Q, NT 11-K, NT 20-F, Form D and Form 144, with the SEC's EDGAR system. The invention minimizes the amount of time spent preparing and submitting error-free SEC reports by such compliance professionals. According to certain preferred embodiments, the invention provides that the on-line forms exhibit an appearance and format that is substantially similar to the official SEC forms. In addition, an important aspect of the invention provides that such forms (reports) are displayed and viewable within a single dynamic web page or screen, thereby allowing a user to enter all necessary data without the need to toggle between multiple tabs, sections, and/or pages.

Figure 1:
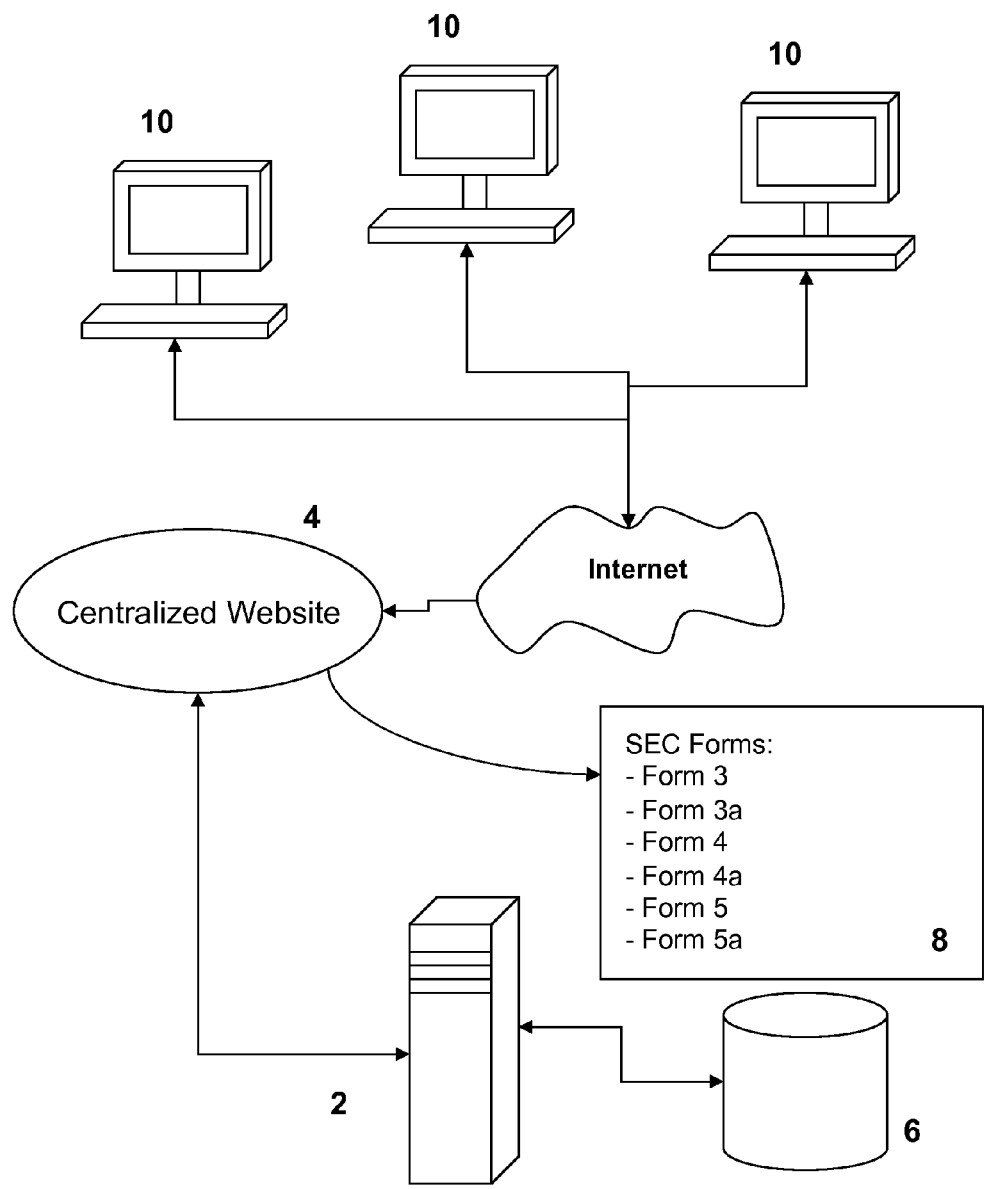
FIG. 1: is a diagram of the various components of the systems described herein, including a menu option for selecting a specific type of report to prepare and submit within the website described herein.
Figure 2:
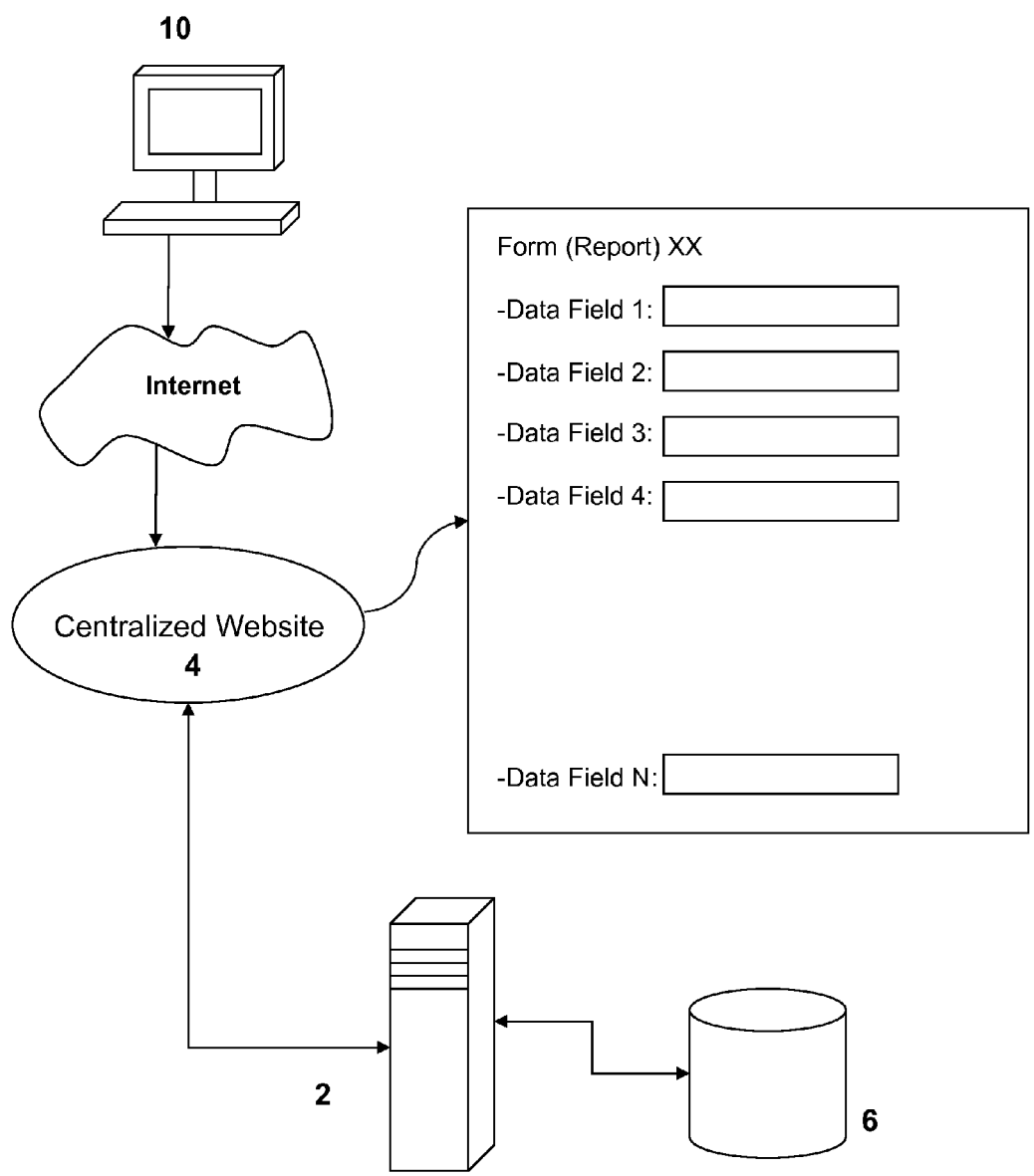
FIG. 2: is a diagram of the various components of the systems described herein, illustrating a report being prepared in the centralized website of the present invention.
Figure 3:
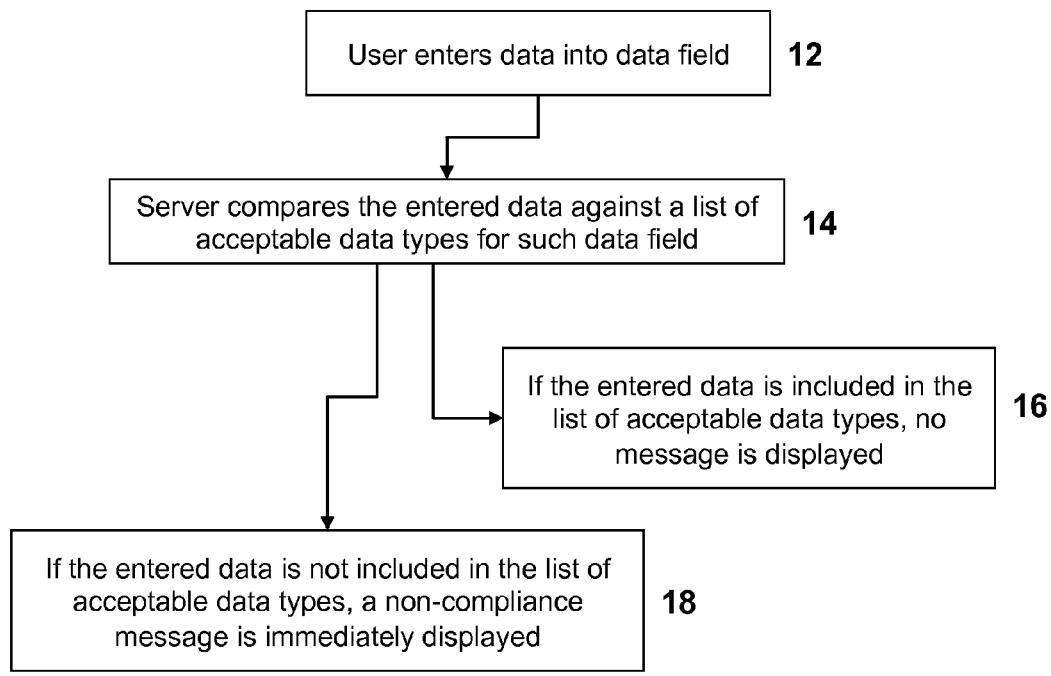
FIG. 3: is a flow diagram that illustrates the general procedures followed by the validation engine described herein.

Referring now to FIGS. 1-3, the invention comprises a system for preparing and submitting a report (in an on-line environment) to a securities regulatory agency, such as the U.S. Securities and Exchange Commission (the "SEC"). More particularly, the system is preferably configured to electronically submit such reports to the Electronic Data Gathering, Analysis and Retrieval ("EDGAR") System that is maintained by the SEC. According to certain preferred embodiments, the invention comprises a server 2 that hosts a centralized website 4, through which a plurality of different users may each access, prepare, and electronically submit one or more of a plurality of standardized reports 8 to a regulatory agency through an on-line portal. That is, the invention provides that multiple, unrelated parties may each utilize the system of the present invention, through a connection between a computing device 10 and the centralized website 4, to access, prepare, and electronically submit one or more of a plurality of standardized reports 8 to a regulatory agency.

The system further comprises a database 6 that houses a listing (table) of the various standardized reports 8 that may be prepared using the system, along with a listing (table) of data fields that are included within each of such reports. These data fields are identified and displayed in a graphical user interface (GUI) of the website 4, and are designed to accept data entered by a user for the purpose of preparing a selected report. These data fields may accept data from a user according to various means, such as text fields, drop-down menus, option buttons, and other form elements. The entered data are then used by the system to construct the desired report.

The invention provides that the website 4 is configured to display all of such data fields, for a single standardized report, within a single graphical user interface (GUI) of the website. This way, a user of the system may prepare a report, from beginning-to-end, in an on-line environment, without having to toggle between pages, sections or tabs during the preparation of the report (and the user will also be able to view all of the information that will need to be entered, at a single time, while preparing the report). In addition, the invention provides that the graphical user interface (GUI) preferably exhibits the same, or substantially the same, appearance and format as the applicable SEC standardized form.

According to certain preferred embodiments of the invention, the server 2 further comprises a validation engine that the server 2 provides to a user's web browser (e.g., in the form of a JavaScript), which validates the data that are entered into such data fields in real-time. That is, the validation engine provided by the server 2 to a user's web browser is configured to ensure that the data entered by a user is the type of which is acceptable in form, based on the nature of the data field. For example, and referring to FIG. 3, the database 6 will preferably include a listing of acceptable data types for each of the data fields included within each type of report. Upon a user entering data 12 into a data field of a report, the validation engine will compare 14 such entered data against a listing of acceptable data types for such data field (which are housed within the database 6). If the entered data is the type of which is appropriate for the relevant data field, and is included in the list of acceptable data types for such data field 16, then the validation engine does not take any further action—and the user may continue to prepare the remainder of the report. Alternatively, if the entered data is the type of which is not appropriate for the relevant data field, and is not included in the list of acceptable data types for such data field 18, then the validation engine will signal a non-compliance message to the user. The non-compliance message may, for example, be immediately displayed to the user within the graphical user interface of the website 4, immediately after such data is entered by the user. The invention provides that the validation engine may further check to ensure that the entered data comply with additional requirements mandated by the SEC's EDGAR system (and other technical requirements).

As mentioned above, with respect to the validation engine, when a user of the system described herein visits the website 4, the server 2 will cause a code module (a JavaScript module) to be downloaded into the user's computer 10 vis-à-vis the web browser. This JavaScript module represents what is referred to herein as the validation engine. Once such code is fully downloaded, the code is ready to be executed within the web browser through the web browser's built in JavaScript interpreter. At this point, the validation engine has been fully installed into the user's computer 10, and is able to carry out the validation functions described herein.

The validation engine monitors certain data fields of interest within each form/report (as a user is preparing a report), and detects events of interest. In essence, the validation engine detects any changes in such data fields. Upon data being entered into (or altered within) any such data field, the validation engine will perform the type of validation function described herein. For example, if a user selects a particular "check box" or an item from a "drop-down menu," this will trigger the validation engine to perform a validation function. For example, for a data field in which a date is selected, the validation engine will verify that the date specified complies with SEC regulations, EDGAR technical specifications, or other parameters. Similarly, as described above, when a user enters certain text into a text field and then tabs out of such text field, the validation engine will immediately perform a validation to ensure that the entered text complies with SEC regulations, EDGAR technical specifications, and/or other parameters.

The invention provides that upon the validation engine detecting an error in a particular data field, a message is immediately displayed (as described above), and the user is allowed to correct such error. The invention provides that the validation engine continues to monitor the new data that are entered into such data field and performing validations thereon, such that as soon as compliant data are entered, the error message will immediately disappear from the user's screen, thereby providing a real-time validation feature for the user. Still further, the invention provides that the system provides a comprehensive validation function, which a user may activate at will. More particularly, after completing the preparation of a report, a user may execute a comprehensive validation function which causes the validation engine to validate all data fields included within such report. Such validation may be carried out by comparing the entered data in each data field against certain XML technical specifications that are housed within a JavaScript rules engine, whereby such XML technical specifications are based, in part, on SEC criteria. This comprehensive validation function may also be configured to validate the correctness of footnotes, which are not assigned to a particular data field.

The invention provides that the system employs the use of HTTPS (hypertext transfer protocol secure) encryption when exchanging data between a user (through a computing device 10) and the server 2. The HTTPS encrypted connection is preferably created when a user enters correct login information through the website 4. More particularly, upon a user entering such login information through the website 4, the server 2 compares such login information with a table of authorized users and their correlated login information within the database 6, such that if the entered login information matches that of an authorized user, the user is granted access to a secure, HTTPS-encrypted, and non-public web portal (through which additional information may be exchanged with the server 2 and the reports described herein may be prepared and submitted to the SEC).

The invention provides that the system further comprises a secure, HTTPS-encrypted, and non-public dashboard (within the web portal referenced above). The dashboard preferably displays, among other things, a listing of all reports that the user has previously prepared and saved, but not yet submitted to the SEC, and another listing of all reports that the user has previously filed successfully with the SEC. The invention provides that the dashboard further displays, for each saved report, a plurality of additional information regarding each report, such as a client reference number, a SEC form type, an issuer identifier, a reporting owner, a date of report, an error status, a submission status, a date on which the report was last saved, or combinations of the foregoing. According to certain embodiments, if there are more than a pre-defined number of reports, e.g., ten reports, which are in a saved (but incomplete and/or not yet submitted state), the dashboard will create a paginated menu, in which the user may view summary information for a pre-defined number of saved reports at a time (e.g., 10 reports at a time). The invention provides that within the dashboard, the user may also edit, clone, amend, delete, download to PDF, test file, live file or schedule for future test or live filing any report that is displayed within such dashboard.

According to certain embodiments, the system further includes various tools that are designed to facilitate and expedite the preparation of SEC reports—in addition to reducing the amount of errors arising from such activity. For example, the user may instruct the server 2 to automatically populate one or more data fields of a report with information that is correlated within the database 6 with a specific securities issuer. For example, the user may begin preparing a report by identifying the relevant securities issuer in the assigned data field. The server 2 may then, automatically or pursuant to the user's instructions, query the database 6 for relevant information that corresponds to that particular issuer, and then populate the appropriate data fields in the report with such correlative information. This feature limits the amount of time required to populate such data fields, and further increases the accuracy of the information entered (or populated) in such data fields.

Still further, according to certain embodiments, the system of the present invention may automatically detect issuer/reporting owner relationships (as recorded within the database 6). For example, upon a user selecting a reporting owner within the secure web portal, and when the selected reporting owner is only associated with a single issuer within the database 6, the server 2 will default the issuer selection to that associated issuer. If the user changes/edits the default issuer selection, the system will generate and display, in real-time, a message stating that the modified issuer identification is not associated with the reporting owner (and that a new association will be created in the database 6).

According to certain embodiments of the present invention, the system comprises a reporting owner information management console. In this console, new reporting owners may be added to the system, existing reporting owners may be deleted, or a user may edit certain information that pertains to a particular reporting owner (e.g., relationships with issuers, names, addresses, signatures, and other information). In addition, according to such embodiments, the system preferably includes an issuer information management console. In this console, issuers may be added, deleted, or information regarding the same may be modified (with such additions, deletions, and modifications being recorded in the database 6, for quick retrieval by the system when a user prepares a new report).

Another tool that may be included in the system of the present invention is a tool that allows a user to copy and paste, or clone, selected content from one area of a report to a second area of the report. Additionally, the system preferably comprises a cloning tool that allows a user to copy and reproduce a previously saved (or submitted) form, thereby allowing the user to customize the report by simply editing the information that needs to be corrected (and eliminating the need to enter all other data that is still correct from a previously saved/submitted report). Such cloning functionality may also be used to, for example, clone (copy and reproduce within the same or a different report) a selected row of data (or a selected and limited number of data within a series of data fields).

Still further, the system may include a tool that may be used to archive prior versions of a report within the database 6, which may later be accessed and viewed by the user from within the dashboard. In other words, the system may employ versioning capability, such that a user may revisit data that s/he entered in a report and subsequently changed. In addition, such versioning capability allows a user to create delta views (blacklines) of a particular report, which highlight the changes made from one version of a report to a subsequent version of the same report.

According to yet further embodiments of the invention, the system may include a footnote engine, which is configured to facilitate the creation of footnote entries. The invention provides that when a user clicks or tabs into a data field, a button dynamically appears that, when clicked upon, opens the footnote engine within the web page. The footnote engine may include, for example, a footnote library, a footnote re-ordering function (which may be executed via a "drag and drop" action), and an auto-numbering of footnotes function (even if footnotes are deleted or re-ordered). In addition, the system may provide various functions for controlling the organization of a report, such as a tool that enables a user to re-order (or add or delete) a plurality of rows of securities-related information in a report, i.e., to enable a user to order the securities in any desirable order.

After completing the preparation of a report within the secure and encrypted portal of the website 4, the user may cause the server 2 to execute a schema validation function. More particularly, the system of the present invention will review and validate that the data entered into the various data fields complies with the applicable form requirements, either mandated by the SEC generally (or by the EDGAR system). The invention provides that such validation function may be initiated by a user instructing the server 2 to execute such function, and/or each time that a user saves a prepared report within the system.

As explained above, after completing the preparation of a report within the secure and encrypted portal of the website 4, the user may electronically submit the report to the SEC's EDGAR system. Preferably, the server 2 will automatically archive and save an electronic copy of the completed and validated report within the database 6, which may later be accessed within the dashboard of the web portal. In addition, according to certain embodiments, the invention provides that the user may instruct the server 2 to electronically submit the completed and validated report to EDGAR at a future time specified by the user. That is, the user may schedule a time in the future, when the report will automatically be submitted to the SEC via EDGAR. Still further, the invention provides that the server 2 is configured to execute, at a user's option, a test filing of a report. Under a test filing, the server 2 performs a validation function, and prepares the report for submission, but does not actually submit the report to the SEC via EDGAR.

According to still further preferred embodiments of the present invention, upon submitting a report to the SEC, the system will automatically store—within the database 6—certain information pertaining to the relevant issuer, reporting entity, and other information related to such EDGAR filing. This way, as explained above, when additional reports are prepared following such filing, certain standardized information may be retrieved from the database 6 (e.g., based on the issuer identity) and automatically populated into the relevant data fields of a new report. As explained above, such data archiving and retrieval functionality facilitate and expedite the preparation of additional reports (and increase the accuracy of the information/data included therein).

Importantly, the invention provides that all of the above-referenced features are accessible and executable within a 1-page report (or within the dashboard), thereby minimizing the amount of complexity and time required for users to prepare and file an SEC-related form. The inventors have demonstrated—through the use of internal studies—that the time required to prepare a filing using the subject invention is about 75% shorter than the time required to prepare a filing with any other currently-available electronic filing solution.

The invention provides that the system described herein further comprises an ability to communicate with third party systems in order to determine the status of a transmitted filing. More particularly, upon the user transmitting data to the EDGAR system (a third party) through the system, EDGAR returns a response to indicate whether the transmitted data has been accepted or rejected by EDGAR. EDGAR transmits this response in the form of an email to the list of emails linked to the transmitter Central Index Key (CIK). The system includes an internal email address among the list of emails related to the transmitter, so that it can receive this email, parse the email and display in the user's on-line dashboard (in real time) whether EDGAR accepted or rejected the filing. Once the status of the filing has been determined by the system, the system may then send a text message to the user who submitted the related filing and indicate whether the filing has been accepted or rejected. Furthermore, the system will remove an accepted filing from an "Unfiled Form" section of the user's on-line dashboard to a "Filed Form" section of the dashboard. Rejected filings will remain within the "Unfiled Form" dashboard and the system will highlight these forms in a distinct fashion.

The system will maintain in its database 6, for every issuer, a list of reporting owners and their associated security balances. The invention provides that the system will calculate the security balances based on the transactions entered by the user during the preparation of a filing with the SEC. The system will perform this calculation only when the filing is actually transmitted to and accepted by the SEC (based on confirmation from the email parsing system described above) and, at such time, the system will update the security balances of the implicated reporting owners and associated security holdings.

The system of the present invention also comprises an import capability. Specifically, upon submitting a valid identifier number (e.g., a CIK) along with a date range, the system will output all of the SEC forms (in XML format) and account balances that are correlated to the entered CIK within the SEC's system. Furthermore, the system will parse each of these XML forms and save to its database 6 the data and relationship information inherent within each XML form. Still further, the system employs a cyclical directed graph to determine the proper order of previously filed, or imported, forms to ensure that reporting owner security balances are 100% accurate and in-sync with the balances that reside on the SEC's website. The system will use this cyclical directed graph to search through a reporting owners transaction history to allow for users to query the system for reporting owner security balances given a specific date or date range.

According to yet further embodiments, the invention further comprises a data autofill capability, whereby the user enters a keystroke and all matching records pertaining to the field where the user entered the keystroke will appear in a drop down list for the user to select as an entry into the field. As the user enters additional keystrokes, the result set is shortened to only those results that match all of the users keystrokes in sequence. This functionality is also employed in the footnote engine described above.

The system of the present invention also comprises the ability to transform any saved web form into a PDF form in real time, without necessarily having to first create a PDF, store it within the server 9 and then respond to a request for a PDF by uploading the PDF. When a user commands the system to produce a PDF version of a particular web form, the system calls upon an internal PDF generation library coupled with native rules to produce a PDF document that exhibits the appearance of the SEC's paper form, with the data provided by the user in the proper fields.

The system of the present invention further comprises an attachment utility, which further comprises an ASCII code conversion module. This conversion module allows a user to copy text directly from a third party word processor, such as Microsoft Word, and paste such content into a web entry field, such that the system may then automatically and seamlessly to the user convert the pasted text into clean ASCII code (which will be void of any Microsoft specific codes or tags). According to such embodiments, the ASCII conversion output is then transformed into XML, such that it may then be submitted along with a subsequent EDGAR filing.

Although certain example methods, apparatus, and/or articles of manufacture have been described herein, the scope of coverage of this disclosure is not limited thereto. On the contrary, this disclosure covers all methods, processes, devices, and/or articles of manufacture fairly falling within the scope of the appended claims—either literally or under the doctrine of equivalents.

What is claimed is:

1. A system for preparing and submitting a report to a securities regulatory agency, which comprises:
   (a) a server that hosts a website in which a user may access, prepare, and submit one or more of a plurality of standardized reports to the regulatory agency through an on-line portal; and
   (b) a database which comprises (i) a listing of the plurality of the standardized reports and a listing of data fields that are included within each of the standardized reports and (ii) a listing of acceptable data types for each of the data fields, wherein the website is configured to display all of the data fields for a single standardized report within a single graphical user interface of the website.

2. The system of claim 1, wherein the on-line portal is an Electronic Data Gathering, Analysis and Retrieval System (EDGAR) that is maintained by the United States Securities and Exchange Commission (SEC).

3. The system of claim 2, wherein the server comprises a validation engine that is provided to a user's web browser, which compares data entered through the website by the user in a data field against the listing of acceptable data types for such data field, and is configured to signal a non-compliance message if the data entered by the user is not included within the listing of acceptable data types for such data field.

4. The system of claim 2, wherein upon the user transmitting the report to EDGAR through the system, EDGAR returns a response to indicate whether the transmitted report has been accepted or rejected by EDGAR.

5. The system of claim 3, wherein said non-compliance message is displayed within the graphical user interface of the website immediately after the data that is entered by the user, which is not included within the listing of acceptable data types, is entered by the user.

6. The system of claim 4, wherein EDGAR transmits the response as an email to a list of emails that are correlated to a specified Central Index Key (CIK) and the system parses the email to update a submission status of the report that was submitted.

7. The system of claim 5, wherein the user may enter login information through the website, whereupon the server compares said login information with a table of authorized users and their correlated login information, wherein if the entered login information matches that of an authorized user, the user is granted access to a secure and non-public dashboard web portal.

8. The system of claim 7, wherein the secure and non-public dashboard web portal displays a listing of all reports that the user has previously prepared and saved, but not yet submitted to the SEC.

9. The system of claim 7, wherein the user may instruct the server to automatically populate one or more data fields with information that is correlated within the database with a specific securities issuer.

10. The system of claim 7, wherein the user may instruct the server to (a) electronically submit a completed and validated form to EDGAR and (b) archive an electronic copy of said completed and validated form within the database, which may be accessed within the secure and non-public dashboard web portal.

11. The system of claim 7, wherein the server is configured to execute a test file of a report upon request by the user, whereupon the server performs a validation function, but does not submit the report to the SEC.

12. The system of claim 7, wherein the website comprises a tool that allows the user to copy and paste selected content from one area of a report to a second area of the report.

13. The system of claim 7, wherein the website comprises a tool that allows the user to copy and reproduce a previously saved form.

14. The system of claim 7, wherein the server comprises a tool that may be used to archive prior versions of a report within the database, which may be accessed and viewed by the user from within the secure and non-public dashboard web portal.

15. The system of claim 7, wherein the database maintains a list of reporting owners and their associated security balances, wherein the security balances are based on transactions entered by each user each time that a report is prepared and filed with the SEC through the system.

16. The system of claim 7, which further comprises an import function, wherein upon submitting a valid Central Index Key (CIK) along with a date range to the server, the server will output all SEC forms, in XML format, and account balances that are correlated to the CIK within SEC records.

17. The system of claim 7, which further comprises a reporting function wherein upon receiving a date range and reporting owner or issuer CIK, the server will output all associated holding balances for all associated reporting owners within the submitted date range.

18. The system of claim 7, which further comprises a search function wherein upon receiving an issuer CIK, a reporting owner CIK, and a date range, the server will output all associated filed forms.

19. The system of claim 8, wherein the secure and non-public dashboard web portal further displays, for each saved report, a plurality of information that comprises a client reference number, a form type, an issuer identifier, a reporting owner, a date of report, an error status, a submission status, a date on which the report was last saved, or combinations of the foregoing.

20. The system of claim 10, wherein the user may instruct the server to electronically submit the completed and validated form to EDGAR at a future time specified by the user.

* * * * *